United States Patent Office 3,008,831
Patented Nov. 14, 1961

3,008,831
PROCESS FOR RECOVERING PROTEIN FROM FATTY TISSUE
George Christianson, Waterloo, Iowa, assignor to The Rath Packing Company, Waterloo, Iowa, a corporation of Iowa
No Drawing. Filed July 27, 1959, Ser. No. 829,499
5 Claims. (Cl. 99—109)

This invention relates to an improved method for separating the lean and other protein portions of meat trimmings from the fat portion. The fat trimmed from various cuts of meat in a packing house unavoidably includes some lean. The trimmings are customarily processed to remove as much of the lean as possible by manually cutting the lean from the fat with a knife. The material which results from such manual cutting may contain as much as 50% lean and, in the case of pork, is obtained from such sources as plates (the portion just behind the neck from the sides and backs; also the portion outside the blade bone), loin trim and belly strips. Although the workers who perform this trimming operation become very skillful, it is still a time-consuming job and their best efforts yield only 10–15% (based upon the weight of the original trimmings) of a 50–50% lean-fat product. This product finds use in sausage compositions like frankfurters, Bologna and luncheon meat.

One object of the present invention is to provide a mechanical method, as distinguished from the prior manual method, for efficiently separating substantially all of the lean portion from the fat in fat trimmings.

Another object is to produce a mechanical method of this kind in which the recovered protein has a high nutritional value because of the increased quantity of important amino acids present.

Another object is to produce a method of this kind in which the separated fat contains very little protein.

A further object is to provide a process of this type in which the meat being processed requires a minimum of handling by the workers so that the bacteria count of the product is substantially reduced as compared to the product made by hand trimming.

Another object of the invention is to provide a process wherein the non-fat portion which is separated from the fat is reproduceable with respect to the protein level.

These objects may be achieved by finely comminuting fat trimmings containing from 7% to about 25% lean meat to produce an emulsion, heating the comminuted material to the melting point of the fat whereupon the emulsion breaks to provide meat fibers dispersed in liquid fat, and separating the meat fibers from the fat. I have found that the minimum quantity of lean meat present in the trimmings is critical. If the lean content is below about 7%, the efficiency of the process is greatly impaired, that is, the yield of protein is not nearly so high. The upper limit on the lean meat content of the trimmings used as the raw material in this process is not critical and will be governed primarily by the source of the fat trimmings. The presence of 7% lean or over produces a more effective separation from the fat, probably because of the affinity of lean protein for other protein. In accordance with the present process I have been able to recover from 30–32% protein as compared to 15% recovery by the conventional manual trimming process, these figures being based upon the same source material. Furthermore, the protein product of the invention is markedly richer in lysine, leucine and arginine, thus providing greatly improved nutritional value.

In practicing the process of the invention a suitable raw material includes fat meat which is normally stripped from various parts of the animal and which includes some lean red meat. Suitable trimmings include beef and pork. Satisfactory pork trimmings are plates which have been skinned, loin trim which is excess fat removed after the loins are pulled by cutting "to the blue," which fat contains appreciable quantities of red meat, and belly strips which include all pieces cut off in squaring bellies. The belly strips or plates, of course, are skinned before treatment in accordance with the invention. These trimmings contain red meat and connective tissue and/or cell walls as an additional protein portion. On the average, the trimmings will contain from 9 to 15% lean but the process is operable for recovering larger quantities of hard-to-remove lean.

The trimmings are diced, if desired, and then comminuted in a suitable comminuting apparatus such as a hammer mill, a silent cutter or a grinder. The material is comminuted for a sufficient length of time to produce a semi-solid meat emulsion. The length of time in the comminuting equipment will depend upon the efficiency of the cutter. It is essential to divide the material very finely to produce the desired breakdown of cells. The comminuted trimmings are then charged into a jacketed kettle and heated to the melting point of the fat (where the fat begins to separate from the cells). The melting point will vary depending upon the source of the fat trimmings and the time of the year at which slaughter took place. It is essential to the process, however, that the temperature not exceed more than about 5° above melting point of the fat. In no case shall the temperature exceed 122° F. In this temperature range there is no danger that the protein portion will be denatured or the water binding properties of the meat reduced. Also, by keeping the temperature low the quality of the fat produced is much superior. The comminuted material is agitated, while the kettle is heated and as the last portion of the fat melts, the emulsion breaks to form a slurry of meat fibers in liquid fat. As soon as the emulsion is broken the slurry is charged into a centrifuge, sieve, or similar filtering means suitable for separating the liquid fat from the non-fat portion.

If desired, the separated, non-fat portion may be used directly in the manufacture of sausage. For example, where a mixture of pork and beef is the source of the trimmings, the non-fat product can be used directly in manufacturing frankfurters. The equipment necessary for performing the invention may be added to the sausage processing equipment and the non-fat product fed into the sausage mix without any intermediate processing. It is also suitable for use in substantial amounts in Bologna, luncheon meat, pimento loaf, canning pork and other food products. Good quality products have been made with as high as 50% of the non-fat product. The taste, color and shelf life of the product are not affected by this quantity of recovered protein material.

Where the non-fat product is not used directly it may be rapidly cooled with Dry Ice in a ribbon blender, or by other heat exchanging means, and stored until needed. The following table provides a direct comparison between the yields of non-fat product from manually separated trim and the product obtained in accordance with the invention. The yields are given for three different sources of pork fat trimmings and are based upon a large number of samples.

|  | Yield in Weight Percent | |
| --- | --- | --- |
|  | Conventional Process | Process of the Invention |
| Plates | 13¾ | 24 |
| Loin trim | 17½ | 23 |
| Belly strips | 21 | 35 |

Specific example

A blend of various pork fat trimmings containing 82 pounds of fat, 13 pounds of lean meat protein and 5 pounds of cell wall protein were diced and then ground for 2 minutes in a silent cutter to comminute the material and convert it to a semi-solid emulsion. The comminuted material was discharged from the cutter into a steam jacketed kettle equipped with a stirrer and the temperature of the mix was raised to 115° F. At this temperature the fat melted and with constant stirring the emulsion broke to form a slurry of meat fibers in liquid fat. The slurry was then pumped to a centrifuge where the non-fat meat fibers were separated from the liquid fat. The non-fat portion was then cooled with Dry Ice in a ribbon blender.

The yield of the non-fat product was 28 pounds, which contained 12 pounds of lean meat, 4 pounds of cell walls and 12 pounds of fat. The complementary 72 pounds of liquid fat contained less than 3% protein in the form of 1 to 2 pounds of lean meat and from ½ to 1 pound of cell walls.

An analysis of the amino acid content of representative samples of the non-fat product was made and the results compared with an analysis of comparable samples of the lean material trimmed by hand in accordance with the conventional process. The results are set forth in the table below:

| Amino Acids | Amino Acid Levels in Recovered Non-Fat Portion (Expressed as percent of trim) ||
|---|---|---|
| | Separation by Manual Trimming | Mechanical Separation by Process of the Invention |
| Arginine | 0.68 | 0.72 |
| Histidine | 0.35 | 0.32 |
| Isoleucine | 0.57 | 0.61 |
| Leucine | 0.70 | 0.90 |
| Lysine | 0.74 | 0.95 |
| Methionine | 0.20 | 0.21 |
| Cystine | 0.10 | 0.13 |
| Phenylalanine | 0.39 | 0.47 |
| Threonine | 0.41 | 0.45 |
| Valine | 0.45 | 0.50 |
| Tryptophan (Microbial) | 0.106 | 0.110 |
| Tryptophan (Chemically) | 0.135 | 0.130 |

It will be appreciated from this specific example that the invention not only produces a higher yield of protein but also produces a protein that is of superior nutritional value. The product of the invention which is obtained from pork fat is designated officially as "partially defatted chopped pork." The cost of this superior product is much lower than that produced manually because of the drastic reduction in labor. Another advantage of the process is that the desired protein levels can be closely maintained so that there is assurance that the product in which the non-fat material is used will always meet minimum standards. This is far more difficult to do where the product results from hand trimming.

What I claim as new and desire to secure by Letters Patent of the United States is:

1. A process for recovering lean protein from meat trimmings containing from 9–15% lean meat fibers which comprises comminuting said trimmings to produce a semi-solid emulsion, raising the temperature of the emulsion to the melting point of the fat but not in excess of 122° F., and recovering the meat fibers from the molten fat.

2. A process for recovering lean protein from pork trimmings containing at least 7% lean meat fibers which comprises comminuting said trimmings to produce a semi-solid emulsion, raising the temperature of said emulsion above the melting point of the fat but not in excess of 5° above said melting point, straining the meat fibers from the molten fat, and rapidly cooling the meat fibers.

3. A process for recovering lean protein from meat trimmings containing at least 7% lean meat fibers which comprises comminuting said trimmings to produce a semi-solid emulsion, heating said emulsion to a temperature above the melting point of the fat but not in excess of 122° F. and recovering the meat fibers from the molten fat.

4. A process of treating pork trimmings containing fat and from 7–15% lean red meat comprising finely dividing said trimmings to reduce them to a semi-solid mass, heating said mass to melt said fat but not in excess of 122° F. while agitating the mass, and filtering the heated mass to separate the molten fat from the lean meat.

5. A process for recovering lean protein from meat trimmings containing at least 7% lean meat fibers which comprises comminuting said trimmings to produce a semi-solid emulsion, heating the emulsion to a temperature at which the emulsion breaks into a liquid fat phase and a solid meat fiber phase but not in excess of 122° F., and straining the solid fibers from the liquid.

References Cited in the file of this patent

UNITED STATES PATENTS

| | | |
|---|---|---|
| 1,930,091 | Halvorson et al. | Oct. 10, 1933 |
| 2,616,910 | Pavia | Nov. 4, 1952 |
| 2,697,112 | Kramer | Dec. 14, 1954 |
| 2,697,113 | Kramer | Dec. 14, 1954 |
| 2,742,488 | Dufault | Apr. 17, 1956 |
| 2,745,856 | Dayen et al. | May 15, 1956 |
| 2,823,215 | Downing | Feb. 11, 1958 |